June 2, 1925.

C. G. REVENY

KITCHEN UTENSIL

Filed Nov. 13, 1924

1,540,284

INVENTOR
C. G. REVENY
BY Wright & Chun
ATTYS

Patented June 2, 1925.

1,540,284

UNITED STATES PATENT OFFICE.

CHARLES G. REVENY, OF SAN FRANCISCO, CALIFORNIA.

KITCHEN UTENSIL.

Application filed November 13, 1924. Serial No. 749,595.

*To all whom it may concern:*

Be it known that I, CHARLES G. REVENY, a citizen of the United States, residing at San Francisco, in the county of San Francisco and State of California, have invented new and useful Improvements in Kitchen Utensils, of which the following is a specification.

This invention resides in the provision of a new and useful kitchen utensil comprising a combined peeling knife of special construction, an apple corer and an apple scoring device, all contained in a simple, compact, single implement which may be easily and effectively used for any one of the above purposes.

One of the objects of the invention is to provide a combined instrument of the character described which has a novel handle or grip portion designed to facilitate and make easier the use of the device.

With the above mentioned and other objects in view, the invention consists in the novel construction and combination of parts hereinafter described, illustrated in the accompanying drawing, and set forth in the claims hereto appended, it being understood that various changes in the form, proportion, size and minor details of construction within the scope of the claims may be resorted to without departing from the spirit or sacrificing any of the advantages of the invention.

Referring to the drawing.

Figure 1:
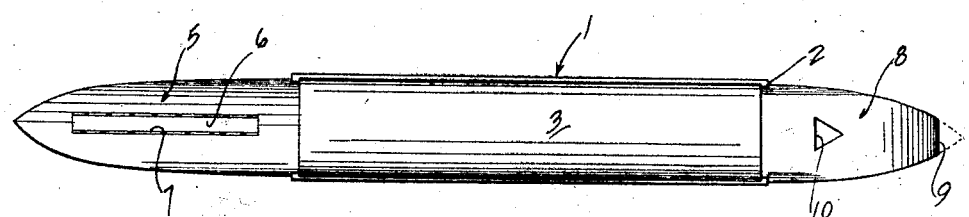
Fig. 1 represents a top plan view of the implement of my invention.
Figure 2:
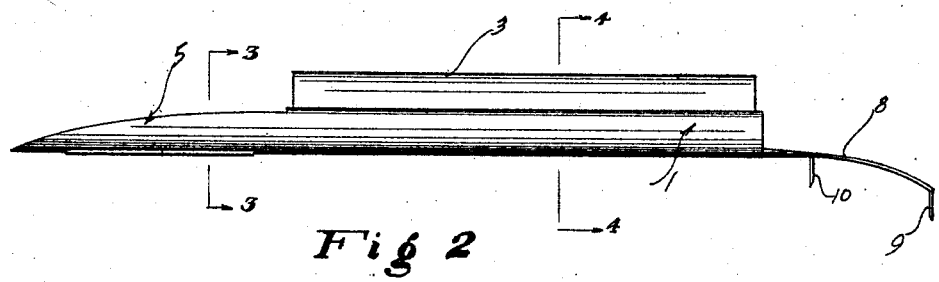
Fig. 2 represents a side elevation of the implement.
Figure 3:
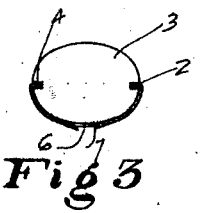
Fig. 3 represents a cross section taken on line 3—3 of Fig. 2.
Figure 4:
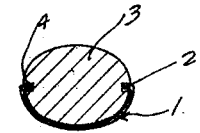
Fig. 4 represents a cross section taken on line 4—4 of Fig. 2.

The embodiment of the invention shown in the accompanying drawing comprises an elongated channeled metallic body portion 1, provided with right angular short flanges 2 on its longitudinal edges. An elongated grip or handle 3, which is preferably oval in cross section, is mounted in the channeled body, there being provided grooves 4 in opposite sides of the handle to receive the flanges 2 so that the handle will be retained in place.

Extending from one end of the body portion is a combined apple coring and peeling blade 5. This blade is formed integral with the body and has an extension thereon, it being reduced and pointed at its outer end and curved in cross section, so that it will serve as a coring element, the edges being sharpened, if desired. A longitudinal slot 6 is cut centrally of this blade 5 and the longitudinal edges of the slot are struck downward and outward slightly, and sharpened as at 7. The sharpened edges 7 provide for effective peeling of the apples, potatoes and various vegetables, whether or not the knife is held in the right or left hand, the peelings extending through the slot during the peeling operation. In using the implement to peel other vegetables or fruit, the operator merely moves the convex side of the blade 5 over the surface of the vegetable or piece of fruit to be peeled, moves the blade towards or away from him, causing either one of the blades 7 to peel the vegetable or piece of fruit and the peeling to extend through the slot. The two sharpened edges provide for an effective peeling, whether the implement is operated in the right or left hand.

Figure 5:
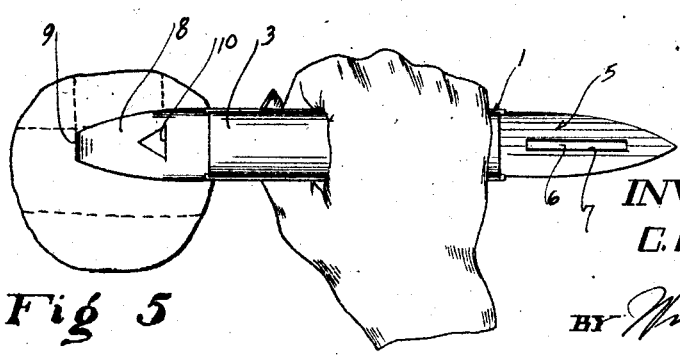
Fig. 5 represents a side elevtaion of the device as used to score an apple.

Extending as a continuation of the body portion from the free end and at said free end is bent outwardly to provide a scoring knife 9 at a point between its ends. This blade has a piece struck downward to provide another scoring knife 10. These scoring knives are disposed out of line due to the curvature of the blade so that the device may be used as shown in Fig. 5 to produce scored lines or cuts on apples or other fruit, particularly apples which are to be baked, so as to cut the skins in scores, the scoring knife being moved first in one direction across the apple, and then in the other. The curved blade 8 provides for an application of the scoring knives to the convex surface of the apple or other fruit.

The handle may be removed at any time in order to clean it and remove any foreign matter lodged between the handle and the body portion. The arrangement of the handle provides for a convenient handle for gripping of the device so that it may be put to any one of its various uses without changing the grip or hold on the handle.

I claim:

1. A kitchen implement comprising an elongated metallic body of channel shape in cross section intermediate of its ends, a handle engaged in the channel shaped portion of the body and implements provided on the portions of the metallic body which extend from opposite ends of the handle.

2. A kitchen implement comprising an elongated metallic body of channel shape in cross section intermediate of its ends, a handle engaged in the channel shaped portion of the body, implements provided on the portions of the metallic body which extend from opposite ends of the handle, said body having grooves extending longitudinally in opposite sides thereof and flanges on opposite sides of the channel shaped portion of the body engaging in said grooves.

3. A kitchen implement comprising an elongated metal body having a channel shaped portion intermediate of its ends and the portions extending from opposite ends of the channel shaped portion constructed to provide different implements, an elongated handle engaged in the channel portion of the body and projecting outwardly from the open side of the channel, said handle having grooves therein and flanges on the body slidably engaging in the grooves.

4. A kitchen implement comprising an elongated metal body member having a channel shaped portion intermediate of its ends, a handle engaging in the channel shaped portion, an implement provided on one end of the body portion, the other end of the body portion being curved and tapering to a point, and spaced scoring knives on said other end.

CHARLES G. REVENY.